(12) United States Patent
Kliegle (10) Patent No.: US 11,072,273 B2
(45) Date of Patent: Jul. 27, 2021

(54) ALL TERRAIN VEHICLE ACCESSORY

(71) Applicant: Dennis Robert Kliegle, Holcombe, WI (US)

(72) Inventor: Dennis Robert Kliegle, Holcombe, WI (US)

(*) Notice: Subject to any disclaimer, the term of this patent is extended or adjusted under 35 U.S.C. 154(b) by 0 days.

(21) Appl. No.: 16/756,172

(22) PCT Filed: Aug. 21, 2018

(86) PCT No.: PCT/US2018/047163
§ 371 (c)(1),
(2) Date: Apr. 15, 2020

(87) PCT Pub. No.: WO2019/078950
PCT Pub. Date: Apr. 25, 2019

(65) Prior Publication Data
US 2021/0197704 A1  Jul. 1, 2021

Related U.S. Application Data

(60) Provisional application No. 62/572,961, filed on Oct. 16, 2017.

(51) Int. Cl.
*B60P 3/34* (2006.01)
*B62D 39/00* (2006.01)
*B62D 63/06* (2006.01)
*B62K 27/00* (2006.01)

(52) U.S. Cl.
CPC ............... *B60P 3/34* (2013.01); *B62D 39/00* (2013.01); *B62D 63/062* (2013.01); *B62K 27/003* (2013.01)

(58) Field of Classification Search
CPC ......... B60P 3/34; B62D 63/062; B62D 39/00; B62K 27/003
See application file for complete search history.

(56) References Cited

U.S. PATENT DOCUMENTS

| | | | | |
|---|---|---|---|---|
| 9,987,890 B1* | 6/2018 | Jans | ....................... | B60D 1/143 |
| 2004/0119262 A1* | 6/2004 | Stout | ..................... | B60B 23/10 |
| | | | | 280/415.1 |
| 2007/0001432 A1* | 1/2007 | Thurm | ................. | B62D 63/061 |
| | | | | 280/656 |
| 2008/0012266 A1* | 1/2008 | Lee | ........................ | B60N 2/005 |
| | | | | 280/424 |
| 2010/0135724 A1* | 6/2010 | Roth | ....................... | E02D 3/046 |
| | | | | 404/124 |
| 2016/0340139 A1* | 11/2016 | Motz | ..................... | A01G 20/18 |

* cited by examiner

*Primary Examiner* — Drew J Brown
(74) *Attorney, Agent, or Firm* — Jose W. Jimenez; Jiminez Law Firm

(57) ABSTRACT

There is provided an ATV accessory that is easily coupled to an ATV for carrying or transporting humans and animals in rough terrain or in snowy terrain. The present ATV accessory also provides for a kit to change the mechanism of moving forward through various terrain from wheels or tires of different sizes to ski-like members to allow for transport through snow or icy trails or rough terrain.

15 Claims, 8 Drawing Sheets

ALL TERRAIN VEHICLE ACCESSORY

CLAIM OF PRIORITY

This application claims priority to and the benefit of U.S. Provisional application with Ser. No. 62/572,961, filed on Oct. 16, 2017, and to PCT application with serial number PCT/US2018/047163, filed on Aug. 21, 2018, entitled ALL TERRAIN VEHICLE ACCESSORY, which are incorporated herein by reference in their entireties.

FIELD AND BACKGROUND OF THE INVENTION

The field of the invention is in the use of equipment for all terrain vehicles (ATV) and ATV transport systems.

Three and four-wheeled ATV vehicles and snowmobiles have been popular for outdoor recreation for many years and are used by many enthusiasts as well to carry riders and guests to remote locations. Outside of recreational uses for ATVs for both dirt and snowy terrains, farmers and outdoors construction people have been known to use such vehicles for transporting materials or even additional personnel. The challenges for safely and efficiently transporting individuals and materials include driving through terrain that is manageable by the ATV vehicle but becomes cumbersome and potentially a safety hazard when transporting people and animals.

ATV rollovers are a serious problem with ATV use. According to the Consumer Product Safety Commission, "The biggest danger facing ATV use is the possibility of a rollover . . . . The majority of injuries are caused under avoidable circumstances including no helmet, poor judgment, vehicle size compared to age, and riding with a passenger on a single-use vehicle." (www.injuryinformation.com/accidents/ATV-accidents.php) Also according to the Wisconsin Department of Natural Resources (DNR): "41% of ATV accidents (2016 in Wisconsin) resulted from rollover including 9 fatalities." (dnr.wi.gov/files/pdf/pubs/le/LE501-2016.pdf).

It would be advantageous to provide an ATV accessory that allows for safe transportation of people and animals and materials, particularly in remote locations and in all types of weather for those also using ATV for non-recreational purposes.

SUMMARY OF THE INVENTION

In one of various example embodiments, there is provided an ATV accessory that is easily coupled to an ATV or snowmobile for carrying or transporting humans and animals in rough terrain or in snowy terrain. The present ATV accessory also provides for a kit to change the mechanism of moving forward through various terrain from wheels or tires of different sizes to ski-like members to allow for transport through snow or icy trails or terrain. The invention described herein also solves a common safety problem for ATV users: tipping over backwards with a second rider on the ATV.

Prior art equipment, such as described in U.S. Pat. No. 3,730,542, does not solve the serious problem of ATV rollover because a potential passenger has no choice but to sit on the seat of the ATV with the driver. This results in an unsafe condition previously identified that contributes to serious accidents and injury. The various embodiments of this invention solves this problem by providing a standing and/or sitting position on the ATV transport system.

In one example embodiment, there is provided an all-terrain vehicle (ATV) accessory including a frame configured to be attached to a motorized vehicle, the frame having a longitudinal axis along a longitudinal length of the frame, the frame having a top surface and a bottom surface and having a vehicle coupling member on a distal end and a user supporting portion on a proximal end of the frame. The accessory also includes an axle disposed under the bottom surface of the frame and perpendicular to the longitudinal axis of the frame, where the axle extends beyond a width of the frame and where the axle includes a forward movement member disposed on each end of the axle. The accessory further includes a dampened or independent suspension system coupled to and disposed on the bottom surface of the frame that supports the axle, with the suspension system having at least one suspension frame assembly including a suspension arm and at least one spring member, the suspension arm having a proximal end coupled to the frame in a cantilevering configuration and having the at least one spring member attached at the distal end of the suspension arm between the bottom of the frame and the suspension arm. The accessory further includes a handle member protruding up from the top surface and proximal end of the frame and disposed adjacent the user supporting portion of the frame. In a related embodiment, the suspension system includes two suspension frame assemblies, wherein each suspension frame assembly includes the suspension arm having a set of spring members disposed on a distal end of the suspension arm, wherein each suspension frame assembly is located on each side of the width of the bottom surface of the frame and each suspension frame assembly is located adjacent each forward movement member. In yet another related embodiment, a kit is provided for converting an ATV accessory frame from a utility transport to an emergency transport which includes components for: a) changing forward movement members adapted for dirt or rocky or rough terrain to forward movement members adapted for snow or icy terrain and b) securing and tethering a patient on the top surface of the frame.

In other embodiments, the forward movement member includes at least one of a wheel, tire, a ski member and an ice blade member. In a related embodiment, the ATV accessory includes an enclosure disposed on the top surface of the frame and coupled at a proximal end to the handle member, wherein the enclosure includes at least two side panels coupled at the proximal end to the handle member and includes an end panel coupled to the distal end of the side panels. As an optional variation, there is also included a removable end panel located adjacent the handle member.

In related embodiments using the frame described above, the frame is supported in a horizontal position on a flat surface when the frame is uncoupled from a vehicle when configured to use at least one of: a) two ski or ice blade members and b) a retractable pole or shaft support located at a distal end of the frame. So as to provide lateral support and to also clear brush and snow ahead of the forward movement members, such as the tires, the frame includes a set of rigid frame guards or fenders coupled to the frame and protruding laterally out and in front of forward movement members.

The aforementioned frame, in various other embodiments, optionally includes an upper support frame assembly disposed on an upper rim or edge of the frame and coupled to the enclosure, wherein the upper support frame assembly is configured to transport at least one of a boat and construction items. In another related modified embodiment, a tent and frame system is included that is attached to the enclosure for conversion of the ATV accessory to at least one of an animal hunting enclosure and an ice fishing enclosure.

In another example embodiment, there is provided an all-terrain vehicle (ATV) accessory including a frame having a longitudinal axis along a longitudinal length of the frame, the frame having a top surface and a bottom surface and having a vehicle coupling member on one end and a user supporting portion on an opposite end. The accessory further includes an axle disposed under the bottom surface of the frame and perpendicular to the longitudinal axis of the frame, the axle including a forward movement member disposed on each end of the axle, where the axle extends beyond a width of the frame. The accessory further includes a dampened or independent suspension system coupled to and disposed on the bottom surface of the frame that supports the axle and the forward movement members, such as the tires. In this example, the suspension system has a suspension frame assembly including at least one spring member attached between the bottom of the frame and a suspension arm. Finally, the accessory includes a handle, of any convenient configuration, that is affixed to the frame adjacent the user supporting portion, thereby allowing the user to steady themselves during movement of the ATV accessory.

In any of the described embodiments, the forward movement member includes a wheel or tire on either side of the axle, each configured with a sufficiently large diameter so as to convert horizontal forces on the frame to vertical forces, thereby increasing a weight capacity of the frame. This is an advantage over other prior art trailers that utilize torsional suspension that fail when subjected to higher weight limits or fail when the weight on the trailer in combination with the rough dirt, snowy or ice terrain damage the torsional suspension, thereby leaving the user stranded. In various embodiments described herein, a kit is also provided for converting ATV accessory forward movement members designed for dirt or rocky terrain to forward movement members designed for snow or icy terrain.

In any of the described embodiments, the ATV accessory frame includes an independent retractable pole or shaft at the distal end of the frame to support the frame in a horizontal position when the frame is uncoupled from a vehicle. In another related embodiment, the ATV accessory frame includes an independent or dampening suspension system that is coupled to and disposed on the bottom surface of the frame that supports the axle, with the suspension system having a suspension frame assembly including a suspension arm and at least one spring member attached between the bottom of the frame and a suspension arm.

BRIEF DESCRIPTION OF THE SEVERAL VIEWS OF THE DRAWINGS

Other important advantages of the invention will be apparent from the following detailed description of the invention taken in connection with the accompanying drawings in which.

DETAILED DESCRIPTION OF THE INVENTION

It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

Figure 1:
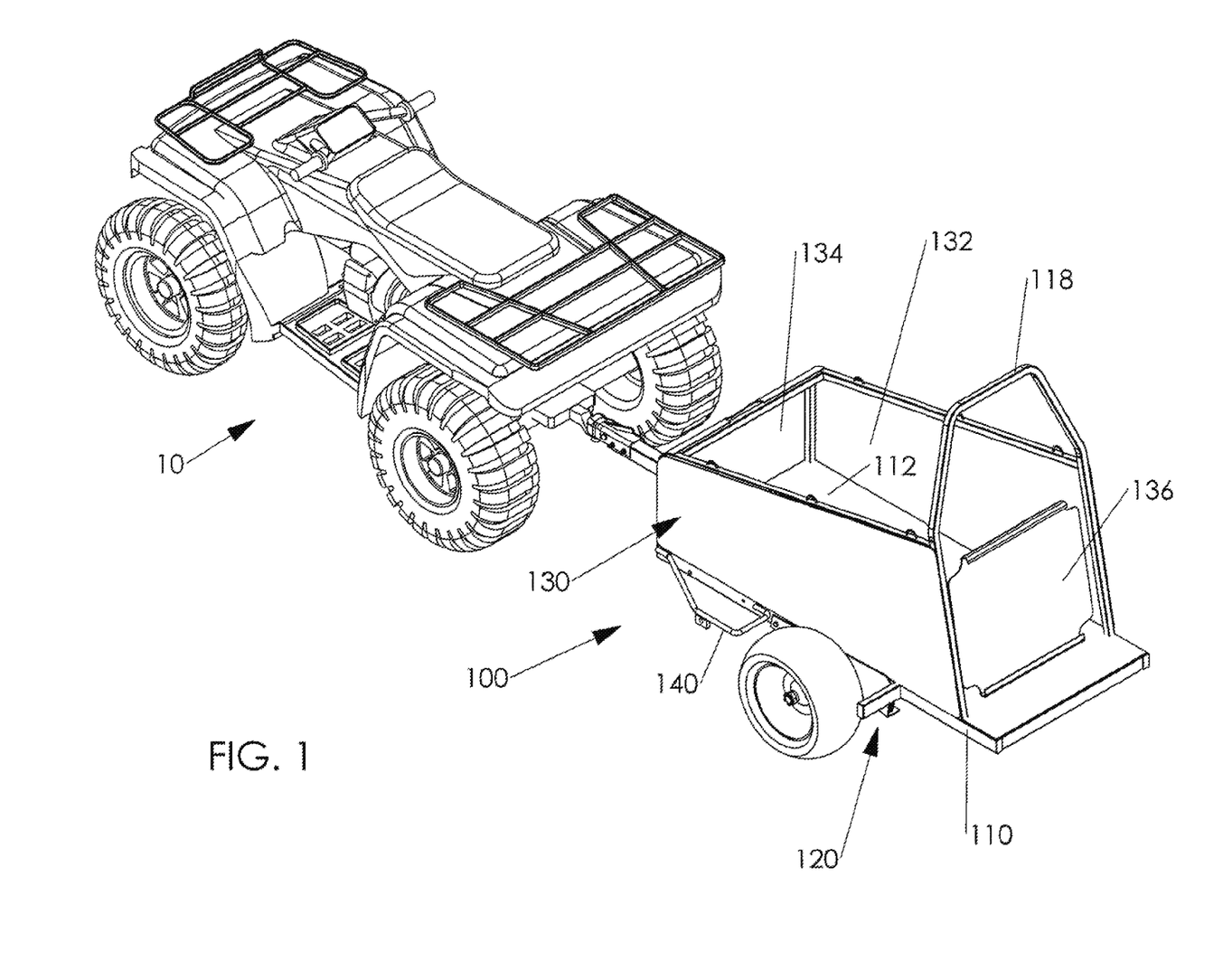
FIG. 1 illustrates a four-wheeled ATV with an ATV accessory configured according to the teachings of the invention.
Figure 2:
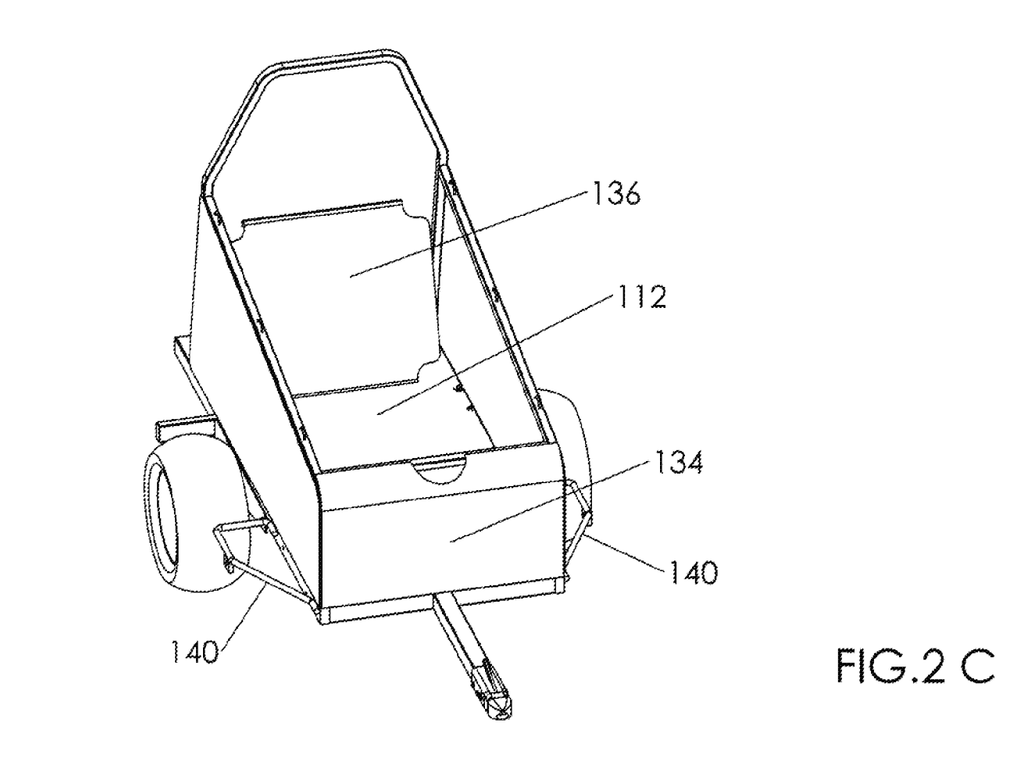
FIGS. 2A-2C illustrate front perspective, bottom perspective and top perspective views of the ATV accessory according to the invention.
Figures 2A, 2B:
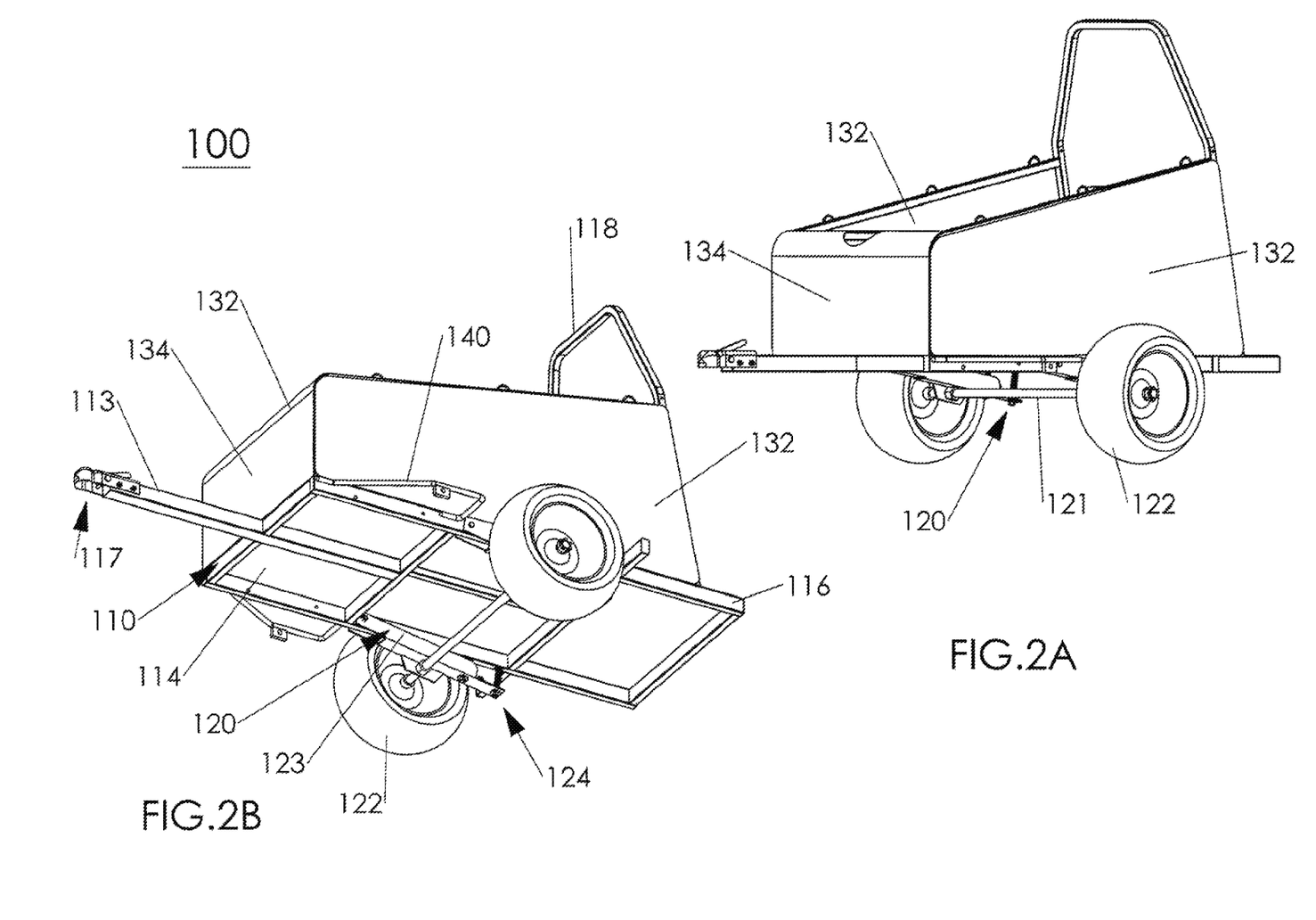

Referring now to all of the figures, in particular FIGS. 1-2C, there is illustrated in FIG. 1 a typical four-wheeled all-terrain vehicle (ATV) 10 with an ATV accessory 100 coupled to it. Further, FIGS. 2A-2C illustrate perspective, bottom perspective and top perspective views, respectively, of the ATV accessory 100 made according to the teachings of the invention. In this and other example embodiments, ATV accessory 100 includes a frame 110, an axle and suspension assembly 120 including wheels 122, an enclosure 130 located on top of frame 110, a rear platform 116, a handle 118, and optionally a set of rigid side guards 140 to protect the wheels as accessory 100 is being pulled through rough terrain or snow. Note from FIG. 1 that ATV vehicle 10 can normally accommodate a driver and perhaps one other passenger. Other ATVs are made similar to small cars that carry at least two and possibly four passengers but all lack a towing mechanism for transporting sports gear or hunted game (such as a deer) at the end of the outing. ATV accessory 100 provides the tool for such use as well as other non-recreational uses.

In this example embodiment, ATV accessory 100 includes a frame 110 that is attachable to a motorized vehicle 10 (or a snowmobile), including but not limited to a 3 or 4 wheeled ATV or a tractor, with frame 110 having a longitudinal axis along a longitudinal length of frame 110, the longitudinal length of frame 110 being greater than a width of frame 100 (but not necessarily limited to such dimensions). Frame 110 has a top surface 112 and a bottom surface 114 and has a motorized vehicle coupling member 113 (and a coupler 117) on one end (or distal end) and a user supporting portion or platform 116 on an opposite end or proximal end. Frame 110 further includes an axle and suspension assembly 120, where an axle 121 is disposed under bottom surface 114 of frame 110 and perpendicular to the longitudinal axis of frame 110, axle 121 further including a forward movement member 122, such as a wheel or tire in this example embodiment, disposed on each end of axle 121. In this example embodiment, the forward movement member includes a wheel or tire on either side of the axle, each configured with a sufficiently large diameter so as to convert horizontal forces on the frame to vertical forces during travel, thereby increasing the weight capacity of the frame. This is an advantage over other prior art trailers that utilize torsional suspension on each wheel or tire that fail when subjected to higher weight limits or fail when the weight on the trailer in combination with the rough dirt, snowy or ice terrain damage the torsional suspension, thereby leaving the user stranded.

Depending on the terrain and uses for accessory 100, the forward movement members can includes ski blades or ice blades to be able to move more easily in snowy or icy terrain. In this example embodiment, axle 121 extends beyond the width of frame 110 for improved stability and suspension, but is not necessarily limited to such a construction.

ATV accessory 100 further includes a dampening and independent suspension system 120 coupled to and disposed on bottom surface 114 of frame 110 and supporting axle 121, with the suspension system having a suspension frame assembly including a suspension arm 123 and at least on spring member 124 attached between the bottom of frame 110 and the suspension arm 123 forming part of suspension frame assembly. In this example embodiment, suspension arm is preferably, but not limited to, using a cantilever configuration such that the proximal end of suspension arm 123 is coupled to the bottom of frame 110 while the distal end of suspension arm 123 includes the at least one spring member 124. ATV accessory 100 further includes a handle member 118 protruding up from top surface 112 of frame 110 and disposed adjacent user supporting portion or platform 116 of frame 110. ATV accessory 110 includes forward movement member 122 which in this example embodiment includes one of a wheel or tire 122 and in a related embodiment is a ski member 222 (FIG. 4A) or an ice blade member (similar to a hockey skate blade). The suspension system described herein is applicable to all forward movement members disclosed herein, including and not limited to wheels or skis. Further, in FIG. 1, the enclosure 130 includes on the upper panels one or more holes or eyelets (not numbered) to be able to tie down items being transported or secure a heavy load (or a patient if used in as an emergency transport).

Referring again to FIGS. 2A-2C, in this example embodiment, ATV accessory 100 further includes an enclosure 130 disposed on the top surface of frame 100 that is coupled at one end (proximal end) to handle member 118, where enclosure 130 includes at least two side panels 132 coupled at one end to handle member 118 (and to frame 110) and an end panel 134 coupled to the distal end of side panels 132. In this example embodiment, enclosure 130 includes a removable end panel or tailgate 136 located adjacent handle member 118. In this example embodiment, removable tailgate 136 can function as a backrest with a seated rider or as a standard tailgate. Tailgate 136 can lay flat (or be removed) to allow for easy loading where heavy materials can be loaded through the rear of accessory 100 and the load does not need to be lifted over the sides (such as when loading heavy materials or loading a heavy deer). Tailgate 136 can also lay flat and extend about a foot beyond frame 110 (and rest on platform 116) so as to use accessory 100 as a rescue vehicle.

In this example embodiment, ATV accessory 100 also includes a set of rigid frame guards 140 coupled to frame 110 that protrude laterally out from each side of frame 110 and are located in front of forward moving members or wheels 122. Rigid brush (or snow) guards 140 deflect small trees and brush (and snow) and also provide a convenient step-up point. In this example embodiment, there are included optional attachment loops on an upper rim or edge of enclosure 130 or on guards 140 which serve as convenient tie-down points.

The various advantages provided by ATV accessory 110 include, but are not limited to: 1) a strong, welded steel frame with diamond-plate aluminum deck 112; 2) an optional padded handle 118 to be held by a standing occupant to maintain balance while riding; 3) standing platform 116 which includes preferably a non-slip deck surface that is low for easy step-up mounting; and 4) outboard tires (or skis) that allow for low deck and follow in the ATV wheel rut, as following in the ATV rut advantageously improves the ride and transportation capabilities of accessory 100.

Figure 3:
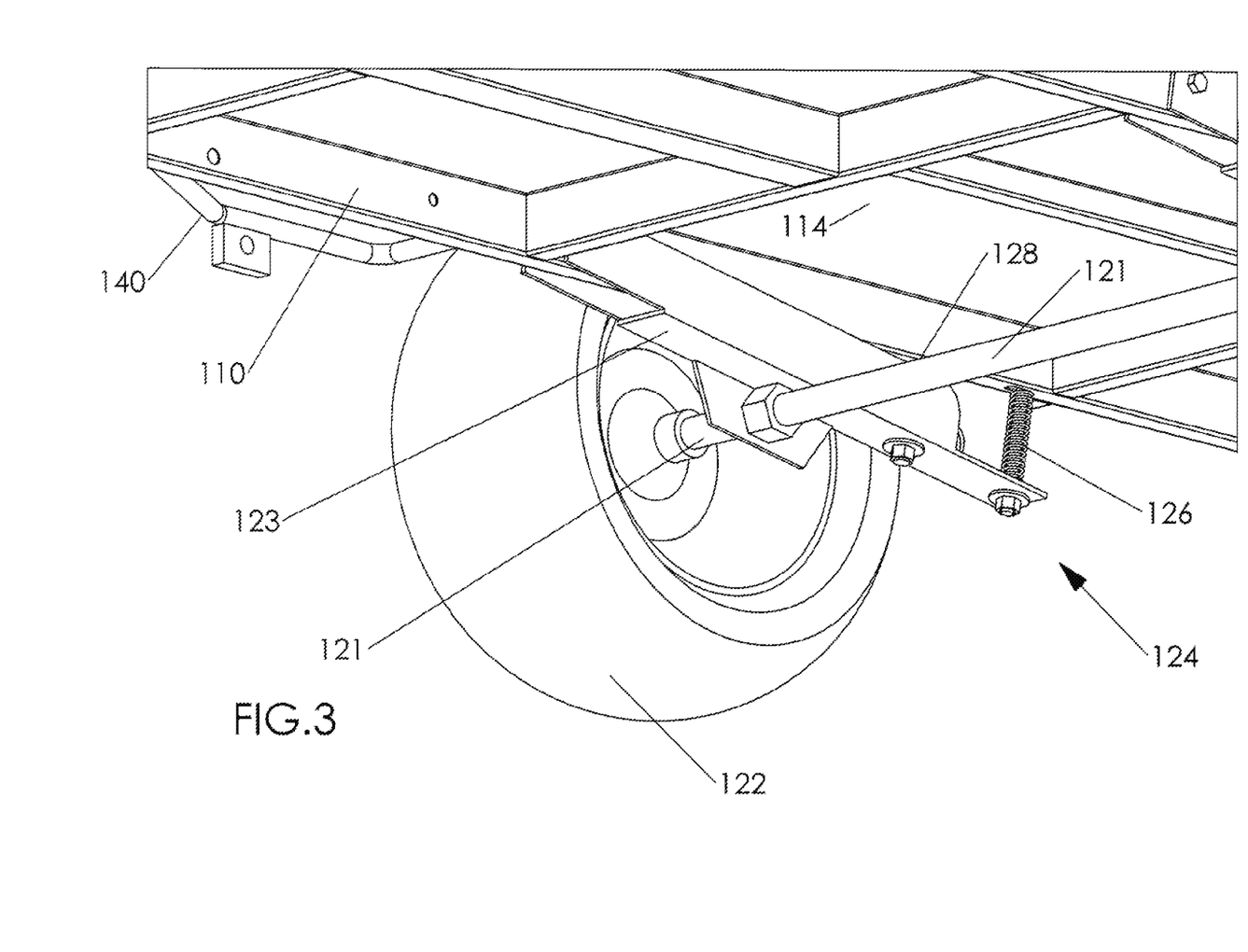
FIG. 3 illustrates an enlarged view of a suspension system and assembly for the ATV accessory according to the teachings of the invention.

Referring now to FIG. 3, there is illustrated an enlarged view of an axle and suspension system and assembly 120 for ATV accessory 100 according to the teachings of the invention. In this example embodiment, suspension system 120 includes two suspension frame assemblies 120A and 120B with each suspension frame assembly including a suspension arm 123 having a set of spring members 124 (springs 126 and 128) disposed on a distal end, and the proximal end of the suspension arm coupled to the frame in a cantilevering configuration (hence the cantilevering suspension arm and spring member(s) help to provide the stable independent suspension the rider needs when on accessory 100). In this example embodiment, two spring system 124 includes 2 springs which complement each other in providing superior stability and weight distribution for both wheels and skis. Hence, forward spring 128 acts as the primary dampening member in the system for the rider or standing user, and the second spring 126 acts in an overload capacity for whatever load is in or on accessory 100. Each suspension frame assembly is located on each side of the width of bottom surface 114 of frame 110 and each suspension frame assembly is located adjacent forward movement member 112, or in this case wheel 122. Advantages to the unique dampened suspension system 120 include providing a stable and no-jarring ride with light or heavy loads, an ultra-low center of gravity and a wide wheel base for outstanding stability through rough terrain or snow. Suspension system 120 is provided because tires alone do not provide enough cushion and shock-absorbing capabilities for a standing (or sitting) rider and because tires/wheels or ski or ice blade alone fail to provide a stable and non-jarring ride for the rider and contents of accessory 100. Finally, this suspension arrangement provides superior weight capacity (and capability) and is configurable to increase the weight capacity depending on the application at very little cost by using a stronger rear spring (and/or optionally a bigger diameter axle).

In particular, each of suspension arms 123 allows enough cushion or shock-absorbing capability to soften rides over rough terrain while preventing bouncing by providing for a cantilevering configuration and structure. In this example embodiment, suspension arm 123 is U-shaped with a wider flange on the outside to prevent a pinch-point. A suspension arm hinge point axle position is located midway between springs 124 (which include individual springs 126 and 128) and the hinge point so that bounce is minimized and to allow for lighter springs. In this example embodiment, front spring 126 handles light loads while second spring 128 acts as an over-load and reduces the natural-frequency tendency that can arise in suspension such as suspension system 120 thereby dampening the system and bounce. In this example embodiment, a cut-out between springs 126 and 128 prevents ice from building up between springs as ice breaks from the up and down action of arm 123 and falls out the cut-out or opening.

Figures 4A, 4B:
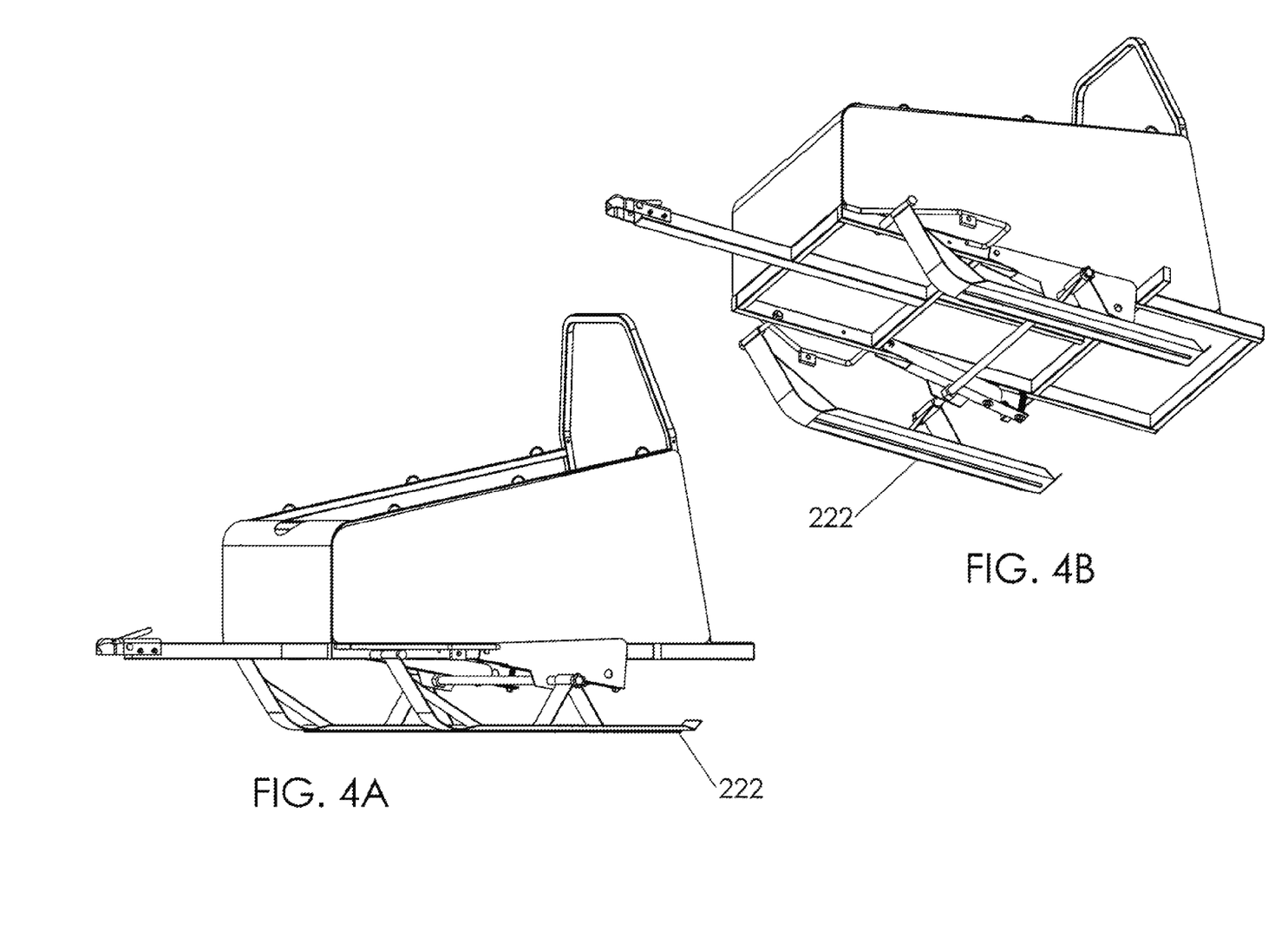
FIGS. 4A and 4B illustrate front perspective and bottom perspective views of a ski member device for the ATV accessory according to the invention.

Referring now to FIGS. 4A and 4B, there is illustrated front perspective and bottom perspective views of a ski member device 222 for ATV accessory 100 according to the invention. ATV accessory 100 has had wheels 122 replaced with a set of ski members 22 that are attached to frame 110 at the front and in the rear at axle 121. An advantage to this design is that ski members 222 can provide support to frame 110 and accessory 100 when in an uncoupled position (when not coupled to ATV 10) and support the uncoupled frame in a horizontal position on a flat surface. In a related embodiment, similar stabilization is achieved in using a retractable pole or shaft near the distal or front end of frame 110 when used in a wheeled configuration (and it is uncoupled from the vehicle). Once converted to skis 222, skis 222 also use dampened suspension system 120 to soften and stabilize the ride for a user. Further, strong but flexible skis 222 are wide to allow ATV accessory 100 to float over the snow or glide on ice and to ride in the ATV wheel ruts. Use of ice blades (not shown) instead of skis are useful for gliding over frozen lakes or ponds.

Figure 5:
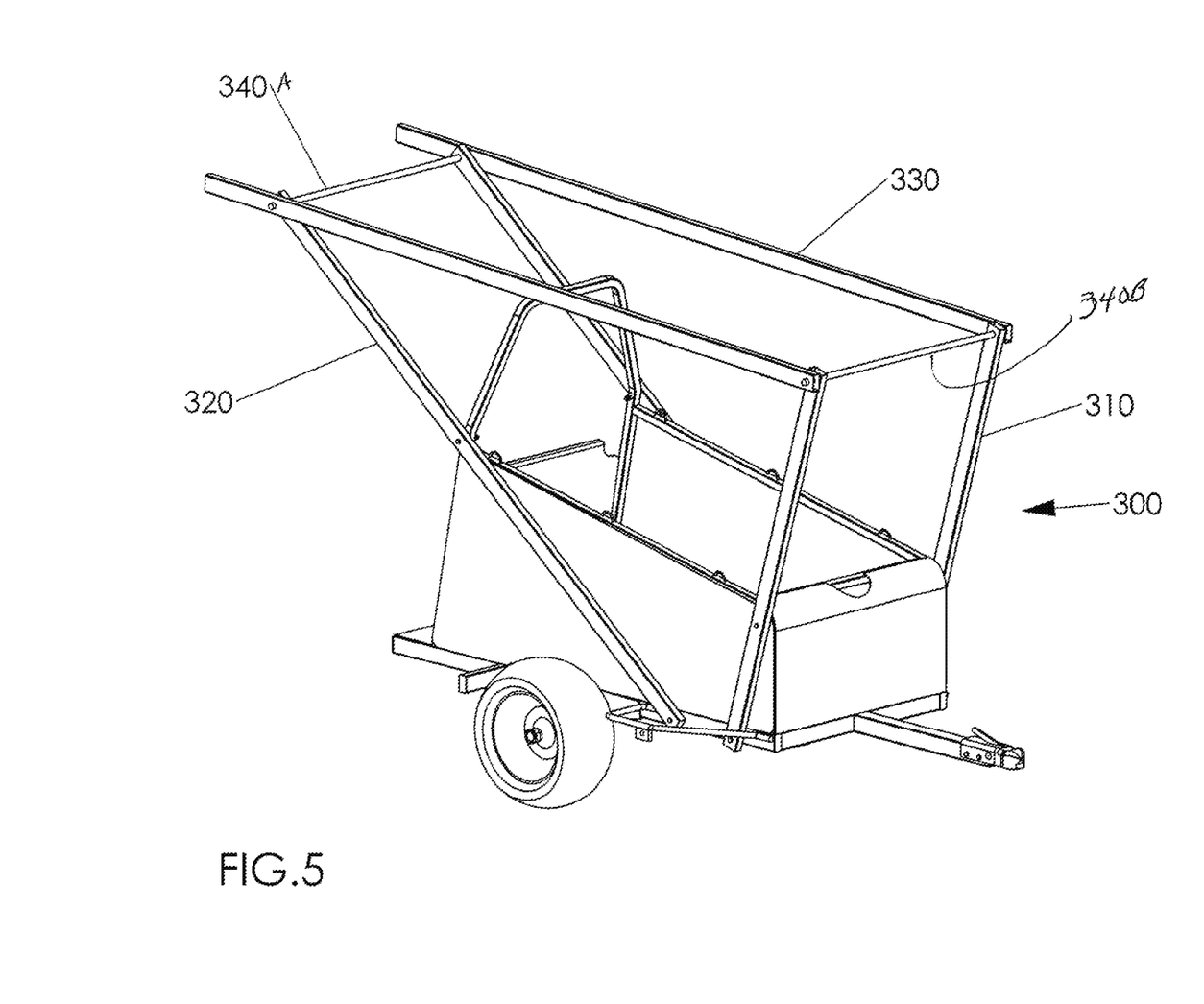
FIG. 5 illustrates a upper transport frame disposed on the ATV accessory for transporting items according to the teachings of the invention.

FIG. 5 illustrates an upper transport frame assembly 300 disposed on ATV accessory 100 for transporting items according to the teachings of the invention. Upper support frame member or assembly 300 is disposed and located on frame 110 and includes a front frame member 310, a side frame member 320, upper side frame members 330 and front and rear cross members 340A and 340B. Frame members 310 and 320 are supported on one end on frame 110 and by handle 118 and by side panel 132. Members 310 and 320 are joined by members 330 and 340. In one example embodiment, an upper rim or edge of the frame assembly 300 allows for transporting of construction materials. In a related embodiment, frame assembly 300 is configured as a Remote Lake Access framework for hauling ladders and construction materials to remote locations and in one example embodiment includes a pulley attachment point for easing the loading of deer, logs or other materials.

Figure 6:
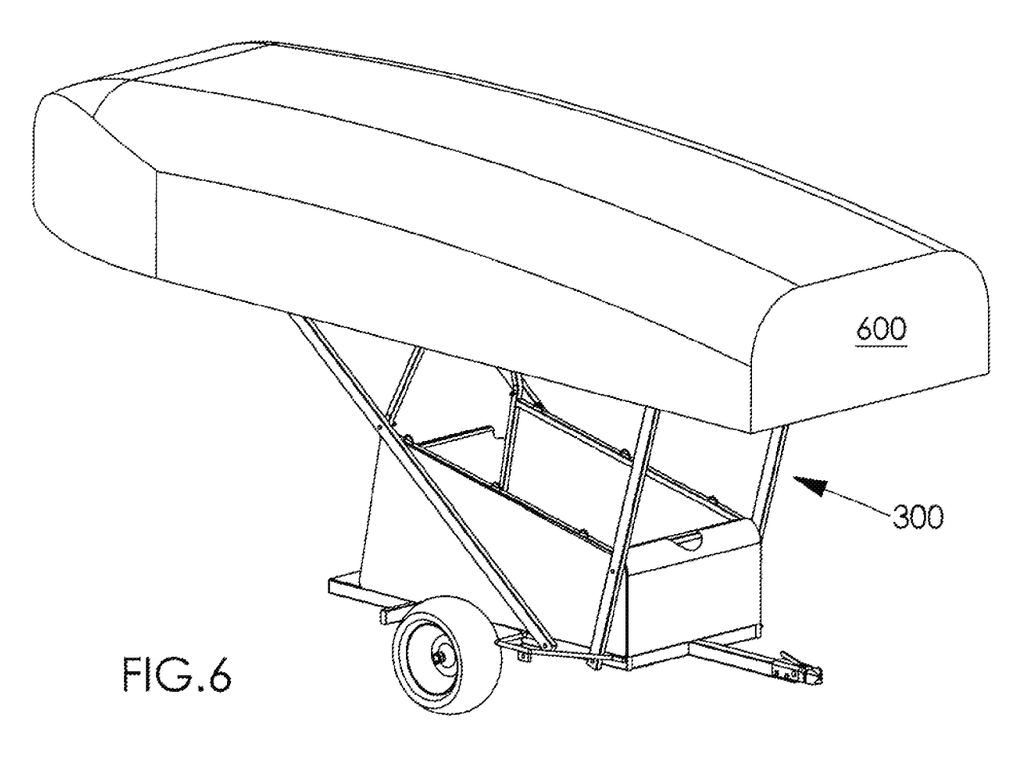
FIG. 6 illustrates the upper transport frame disposed on the ATV accessory for transporting a boat according to the teachings of the invention.

FIG. 6 illustrates upper transport frame assembly 300 disposed on ATV accessory 100 for transporting an upside-down boat 600 according to the teachings of the invention. Boat 600 seats ride on the various frame members of frame assembly 300 to keep the boat low for better stability and to not have frame members outside of the boat profile which could hit trees. In another example, construction materials (e.g., lumber or pipes) and equipment (such as a ladder) can also be transported by upper transport frame 300.

Figure 7:
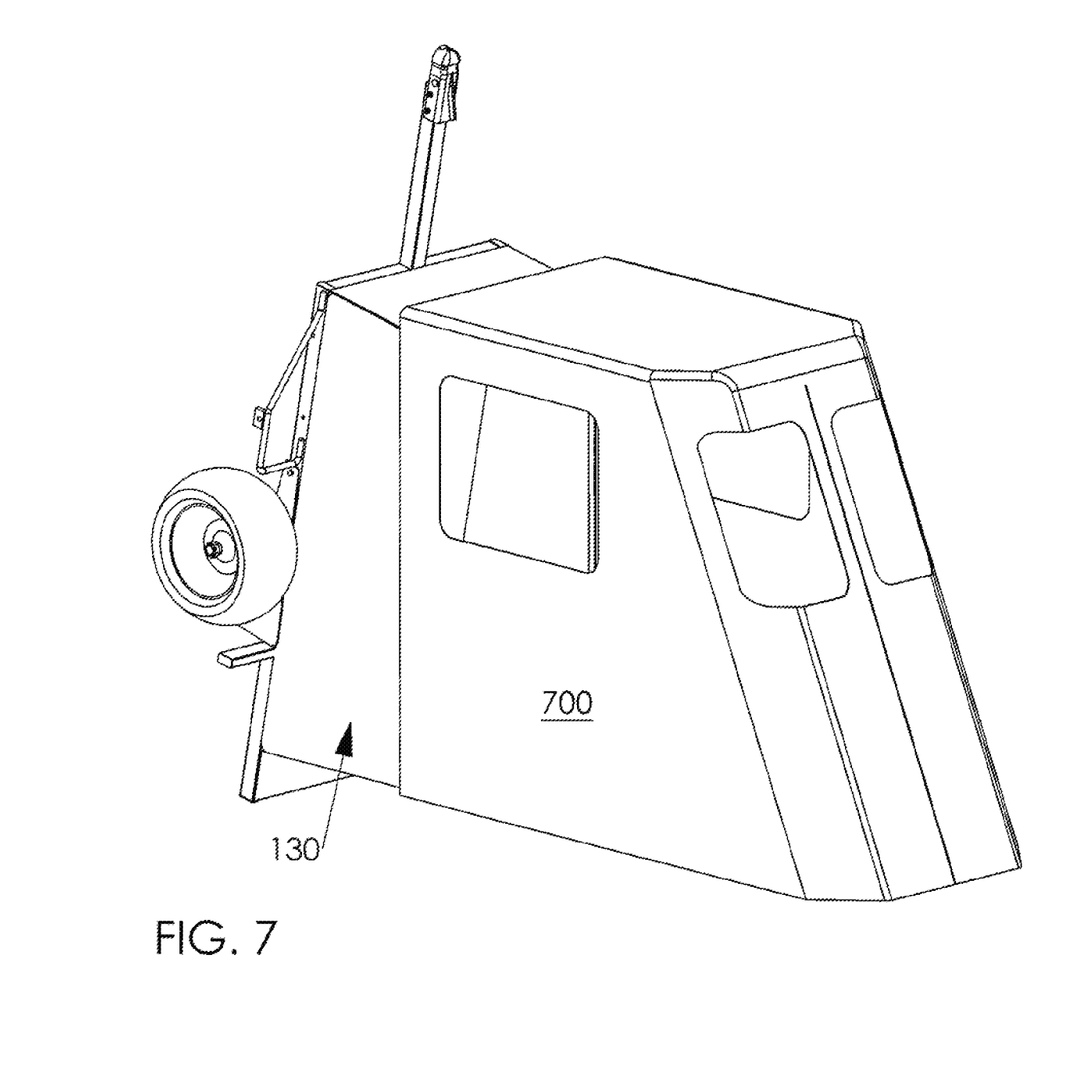
FIG. 7 illustrates a hunting or fishing enclosure kit for the ATV vehicle accessory for creating an enclosure from the ATV vehicle accessory.

FIG. 7 illustrates a hunting or fishing enclosure kit for the ATV vehicle accessory for creating an enclosure from the ATV vehicle accessory according to the teachings of the invention. In this example embodiment, a tent and frame system 700 configured to be attached to enclosure 130 of accessory 100 for conversion to one of an animal hunting enclosure and an ice fishing enclosure. In this example embodiment, accessory is stood on its side with tent (and tent material) and frame system 700 attached at the rim or edge of enclosure 130 for forming a deer or duck blind or a fish house. The tent material is fastened to accessory 100 with standard boat-cover snaps or with a hook and loop fastening system (e.g., Velcro®). System 700 has two U-shaped poles to support the tent feature. Tent and collapsible poles in down or travel position can rest on the trailer tongue. In this example embodiment, vinyl windows are attached with continuous hook and loop fastening strips and can be removed or partially removed for hunting. In this example embodiment, the tent can be configured in summer camouflage, fall camo, winter camo and black to match accessory 100's color.

In another example embodiment, there is provided a kit for converting an ATV accessory 100 from one forward movement member 122, such as a wheel or tire, adapted for dirt or rocky terrain to another forward movement member 122 adapted for snow or icy terrain (FIG. 4A). In one example embodiment, ATV accessory 100 is designed for a medium to small ATVs or snowmobiles. In a related embodiment, other larger versions of accessory 100 are configurable for larger ATV's and UTV's (ultra-terrain vehicles which may include up to 6 people and an optional truck-like bed in the rear).

The following patents and publications are herein incorporated by reference in their entireties: U.S. Pat. Nos. 3,730,542; 7,201,386 and U.S. Patent Publication No. 2013/0221629.

The foregoing specific embodiments of the present invention as set forth in the specification herein are for illustrative purposes only. Various deviations and modifications may be made within the spirit and scope of the invention without departing from the main theme thereof.

What is claimed is:

1. An all-terrain vehicle (ATV) accessory comprising:
   a frame configured to be attached to a motorized vehicle, the frame having a longitudinal axis along a longitudinal length of the frame, the frame having a top surface and a bottom surface and having a vehicle coupling member on a distal end and a standing user supporting portion on a proximal end of the frame;
   an axle disposed under and across the bottom surface of the frame and perpendicular to the longitudinal axis of the frame, wherein the axle extends beyond a width of the frame and wherein the axle is configured to include a forward movement member disposed on each end of the axle;
   a dampened suspension system coupled to and disposed on the bottom surface of the frame and configured to support the axle, the suspension system having at least two suspension frame assemblies with each including a suspension arm and at least one spring member, each suspension arm having a proximal end coupled to the frame in a cantilevering configuration and having the at least one spring member attached at the distal end of the suspension arm between the bottom of the frame and the suspension arm, wherein each suspension frame assembly is located on each side of the width of the bottom surface of the frame and each suspension frame assembly is located adjacent each forward movement member; and
   a handle member protruding up from the top surface and proximal end of the frame and disposed adjacent the standing user supporting portion of the frame.

2. The ATV accessory of claim 1 wherein each suspension frame assembly includes the suspension arm having a set of spring members disposed on the distal end of the suspension arm, wherein the set of spring members includes a rear spring located at the distal end of the suspension arm and a forward spring is located between the axle and the rear spring.

3. The ATV accessory of claim 1, wherein the forward movement member includes at least one of a wheel or tire, a ski member and an ice blade member.

4. The ATV accessory of claim 3, wherein the forward movement member includes a wheel or tire on either side of the axle, each configured so as to convert horizontal forces on the frame to vertical forces, thereby increasing a weight capacity of the frame.

5. The ATV accessory of claim 1, further including an enclosure disposed on the top surface of the frame and coupled at a proximal end to the handle member, wherein the enclosure includes at least two side panels coupled at the proximal end to the handle member and includes an end panel coupled to the distal end of the side panels.

6. The ATV accessory of claim 1, further including a removable end panel located adjacent the handle member.

7. The ATV accessory of claim 1, wherein the frame is supported in a horizontal position on a flat surface when the frame is uncoupled from a vehicle when configured to use at least one of: a) two ski or ice blade members and b) a retractable pole or shaft support located at a distal end of the frame.

8. The ATV accessory of claim 1, further comprising a set of rigid frame guards coupled to the frame and protruding laterally out and in front of forward movement members.

9. The ATV accessory of claim 1, further comprising an upper support frame assembly disposed on an upper rim or edge of the frame and coupled to the enclosure, wherein the upper support frame assembly is configured to transport at least one of a boat and construction items.

10. The ATV accessory of claim 1, further comprising a tent and frame system configured to be attached to the enclosure for conversion of the ATV accessory to at least one of an animal hunting enclosure and an ice fishing enclosure.

11. A kit for converting an ATV accessory of claim 1 from a utility transport to an emergency transport which includes components for: a) changing forward movement members adapted for dirt or rocky terrain to forward movement members adapted for snow or icy terrain and b) securing and tethering a patient on the top surface of the frame.

12. The all-terrain vehicle (ATV) accessory of claim 1 further comprising a retractable pole or shaft at the distal end of the frame to support the frame in a horizontal position when the frame is uncoupled from a vehicle.

13. The ATV accessory of claim 1, wherein the rear spring member attached between the bottom of the frame and a suspension arm is configured for increased weight capacity of the frame.

14. The ATV accessory of claim 13 wherein the axle is configured for increased weight capacity of the frame.

15. A kit for converting an ATV accessory of claim 1 from forward movement members adapted for dirt or rocky terrain to forward movement members adapted for snow or icy terrain which include ski members or ice blade members.

* * * * *